(12) United States Patent
Zuge et al.

(10) Patent No.: US 7,654,766 B2
(45) Date of Patent: Feb. 2, 2010

(54) BALL JOINT

(75) Inventors: Frank Zuge, Schelldorf (DE); Matthias Fuchs, Gaimersheim (DE); Wilfried Leitner, Eichstatt (DE); Bernhard Hammer, Nennslingen (DE)

(73) Assignee: Audi, Ingolstadt (DE)

( * ) Notice: Subject to any disclaimer, the term of this patent is extended or adjusted under 35 U.S.C. 154(b) by 0 days.

(21) Appl. No.: 10/473,406

(22) PCT Filed: May 24, 2002

(86) PCT No.: PCT/EP02/05694

§ 371 (c)(1),
(2), (4) Date: Feb. 26, 2004

(87) PCT Pub. No.: WO03/008820

PCT Pub. Date: Jan. 30, 2003

(65) Prior Publication Data

US 2004/0146337 A1 Jul. 29, 2004

(30) Foreign Application Priority Data

Jul. 13, 2001 (DE) .................. 101 34 106

(51) Int. Cl.
*F16C 11/08* (2006.01)
(52) U.S. Cl. ................ 403/145; 403/31; 403/40
(58) Field of Classification Search .......... 403/31, 403/40, 122, 135, 145, 148, 288; 280/93.511; 384/145, 192, 206, 213
See application file for complete search history.

(56) References Cited

U.S. PATENT DOCUMENTS

| 4,003,667 A | * | 1/1977 | Gaines et al. | 403/36 |
| 4,911,483 A | | 3/1990 | Delamare | 285/268 |
| 4,986,689 A | * | 1/1991 | Drutchas | 403/127 |
| 5,242,228 A | * | 9/1993 | Hattori | 384/145 |
| 5,720,566 A | * | 2/1998 | Allen et al. | 403/38 |

FOREIGN PATENT DOCUMENTS

| DE | 729577 | 5/1939 |
| DE | 37 25 404 A1 | 3/1989 |
| DE | 42 07 602 A1 | 9/1992 |
| DE | 41 30 293 A1 | 3/1993 |
| DE | 200 13 049 U1 | 1/2001 |
| EP | 0 206 131 A1 | 12/1986 |
| FR | 89 02551 | 2/1989 |

\* cited by examiner

*Primary Examiner*—Michael P Ferguson
(74) *Attorney, Agent, or Firm*—Novak Druce & Quigg LLP

(57) ABSTRACT

A ball joint, in particular for the wheel suspension systems of motor vehicles, an external, essentially cylindrical housing, an internal joint piece with a pin supporting a ball section and a bearing race surrounding the ball section, is retained in the cylindrical housing and has annular seals on both sides of the pin ends. In order to achieve a hydraulic damping function, annular gaps are provided about the pin adjacent to the ball section, filled directly or indirectly with a damping fluid.

8 Claims, 1 Drawing Sheet

BALL JOINT

FIELD OF THE INVENTION

The invention relates to a ball joint, in particular for wheel suspensions of motor vehicles, as specified in the claims.

BACKGROUND OF THE INVENTION

A ball joint such as this is disclosed in DE 42 07 602 A1, for example. Such joints, which are rotatable about the central axis of the ball and pivotable through a limited pivoting angle, are often used as suspension joints in wheel suspensions of motor vehicles. In addition to their reliability and smoothness of operation, such ball joints are assigned a specific damping function for eliminating vibrations.

SUMMARY OF THE INVENTION

The object of the invention is to propose a generic ball joint which is advantageous from the viewpoint of structure and production technology and which performs a specific damping function.

It is claimed for the invention that this object is attained by the characteristics specified in the primary claims. Advantageous developments of the invention are set forth in the many dependent claims.

It is proposed in accordance with the invention that annular gaps filled directly or indirectly with a damping fluid be formed around the ball pivot adjacent to the ball section. The damping fluid, preferably one of high viscosity, both ensures smooth operation of the ball joint nearly free of wear and at the same time effectively damps vibrations around the center of the ball within a specific frequency range, in particular when the joint is used as journal bearing in wheel suspensions of motor vehicles. The damping fluid may possess electrorheologic or magnetorheologic properties.

In a structurally favorable embodiment the annular gaps may be bounded essentially by annular extensions on the bearing ring enclosing the ball section. By preference the length of the annular gap should be greater than its width by a factor of 3 in order to ensure adequate damping operation. In addition, the annular gaps preferably may be formed between tapering ball pivot sections and correspondingly configured extensions on the bearing ring; this results in rugged pivot structure and structurally more favorable sealing between the ball pivot ends and the outer cylindrical housing of the ball joint.

An indirect layout in which annular tubes filled with damping fluid are used in the annular gaps is proposed as an alternative to direct introduction of the damping fluid into the annular gaps. Specific damping properties of the ball joint may also be imparted by shaping of the annular tubes (e.g., by use of fabric reinforcements) and by functional separation of lubrication of the joint (e.g., with grease) and the damping medium.

The annular tubes may be seated in prismatic guide rings of the cylindrical housing and butt against annular collars of the ball pivot sections formed in the area of the tubes. When the ball joint is free of load this results in more or less linear contact between the ball pivot sections and the tubes, contact which does not impair smooth operation of the ball joint and also ensures a specified damping behavior.

Use of a damping fluid possessing electrorheologic or magnetorheologic properties makes it possible to create a continuously variable damping characteristic.

Such use permits configuration of a ball joint with controllable torsion damping (driving-dependent change in the damping property) which may be employed, for example, to reduce vibration problems in multiple-rod axles.

A damping fluid characterized by rheologic action presents the advantage of rapid response behavior (damping control almost in real time, so that damping in the area of the natural wheel frequency as well is possible). The damping characteristic of the rheologic fluid may be modified by means of a control device and the damping characteristic of a ball joint controlled accordingly.

BRIEF DESCRIPTION OF THE DRAWINGS

Two exemplary embodiments of the invention are described in greater detail in what follows. The accompanying drawing, in the form of diagrams, shows in FIG. 1, a longitudinal section through a ball joint for wheel suspensions of motor vehicles with specified annular gaps filled with damping fluid on both sides of the ball section.

DETAILED DESCRIPTION OF THE INVENTION

Figure 1:
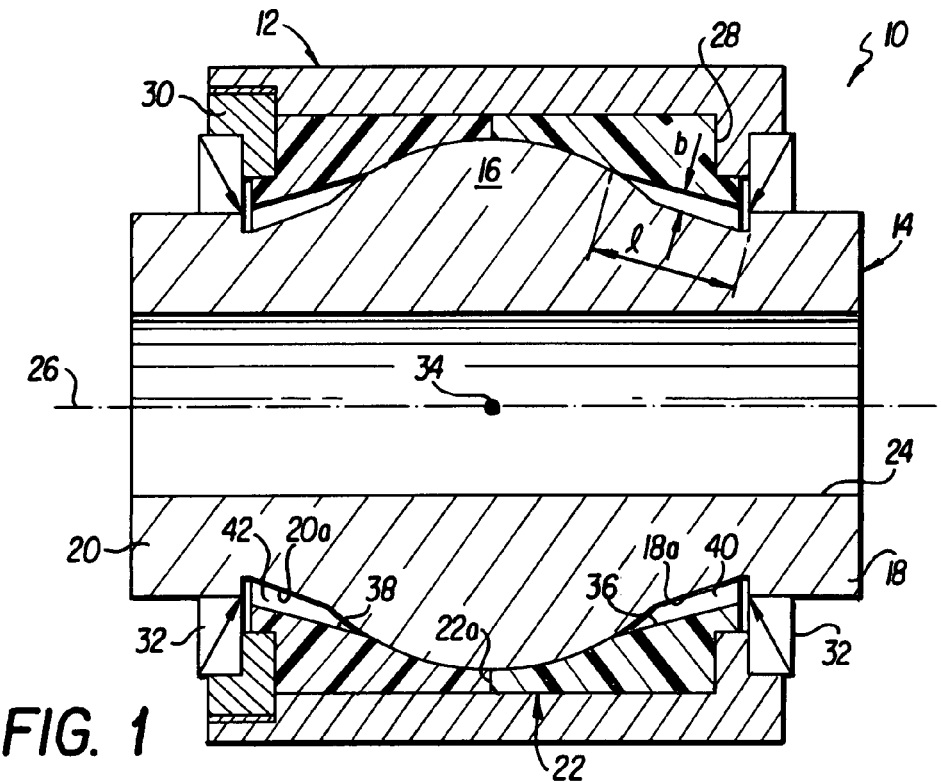

FIG. 1 shows a ball joint designated as 10 which consists essentially of an outer cylindrical housing 12, an inner rotation-symmetric joint pivot member 14 comprising ball pivot shaft portions 18, 20 and a ball section 16 and a bearing ring 22 enclosing the ball section 16.

The joint element 14 has a through opening 24 by means of which this element may be fastened by means of a screw to a wheel carrier of a wheel suspension of a motor vehicle. The cylindrical housing 12 may also be rigidly connected by a method not illustrated to a guide rod of the wheel suspension. The housing 12 and the joint element 14 are made conventionally of metal, while the bearing ring 22 is made of a suitable plastic such as polymethylene oxide.

The bearing ring 22 enclosing the ball section 16 is designed to be of two parts, with a plane of separation 22a extending vertically relative to the joint central axis 26, and is kept axial in the cylindrical axis 12 both on the circumference side and both on an annular collar 28 on one side and on a screwed-in clamping ring 30 on the other.

Annular seals 32 which seal the ball joint 10 from the exterior, but without impairing the required pivotability of the inner joint element 14 about the ball section center point 34, are mounted between the cylindrical sections of the ball pivot 18, 20 and the front ends of the cylindrical housing 10.

In addition, conical ball pivot sections 18a, 20a tapering toward the ends of the ball pivot are formed between the cylindrical sections of the ball pivot 18, 20 and the ball section 16. In conjunction with annular extensions 36, 38 also tapering internally, these ball pivot sections form on the bearing ring 22 annular gaps 40, 42 having a length l and a mean width b, to which the statement $l \geq 3b$ applies.

The annular gaps 40, 42 are filled with a high-viscosity incompressible damping fluid or oil which is tightly enclosed between the seals 32 inside the ball joint 10 and which simultaneously acts as a lubricant.

When vibration of the ball joint 10 is excited around the ball section center point 34, the annular gaps 40, 42 narrow and widen on both sides of the ball section 16 respectively and in the process displace the damping fluid in the circumferential direction, this resulting in performance of a specified damping function. The damping properties may be determined by the configuration of the annular gaps 40, 42 and the structure of the annular seals 32 respectively.

Figure 2:
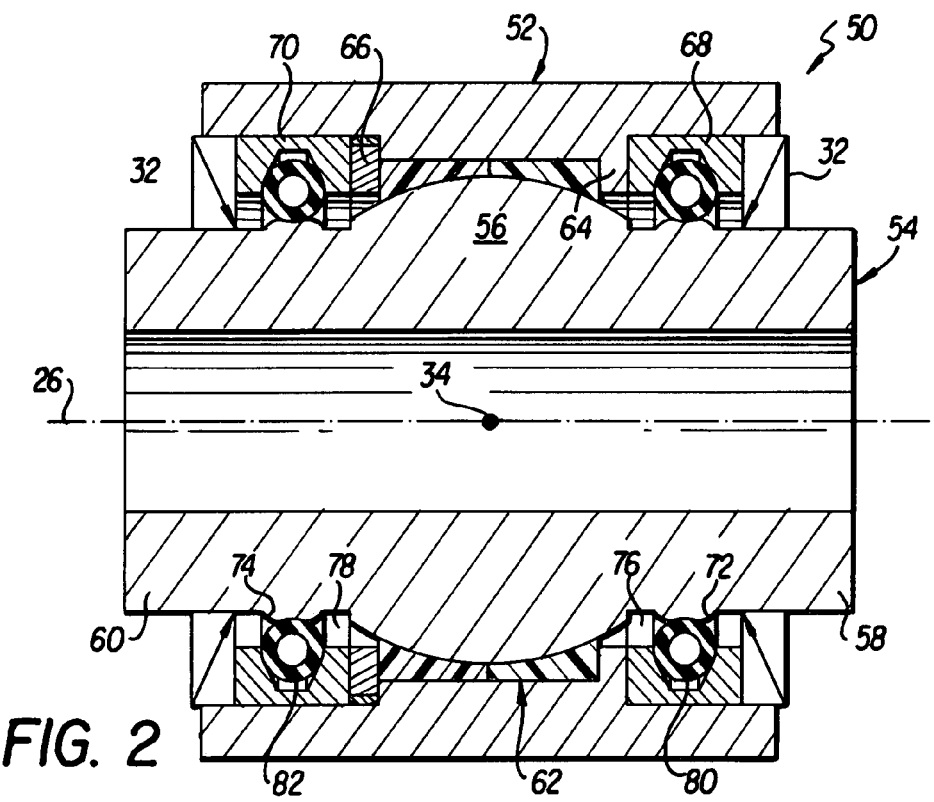
FIG. 2, another longitudinal section through a ball joint with hoses filled with a damping fluid mounted in annular gaps on both sides of the ball section.

In order to avoid repetition, the ball joint 50 shown in FIG. 2 is described only to the extent that it differs from the ball joint 10 shown in FIG. 1. Functionally identical parts are provided with the same reference numbers.

The ball joint 50 in turn has a cylindrical outer housing 52, an internal joint element 54 with a ball section 56 and adjoining ball pivot 58, 60.

The bearing ring 62 enclosing the ball section 56 is retained axially one on side by an annular collar 64 of the housing 52 and by a screwed-in clamping ring 66 on the other.

Adjoining the foregoing a guide ring 68, 70 prismatic in cross-section is fastened in the housing 52 (is pressed in or screwed in).

Spherical annular collars 72, 74 are formed on the ball pivots 58, 60 radially opposite the guide rings 68, 70.

Fabric-reinforced elastic rubber tubes 80, 82 filled with a high-viscosity damping fluid are formed in the annular gaps 76, 78 between the guide rings 68,70 and the ball pivots 58, 60.

The tubes 80,82 are seated to approximately half their circumference in the prismatic guide rings 68, 70 and on the other side rest against the spherical annular collars 72, 74 of the ball pivots 58, 60.

The annular gaps 76, 80, in turn, are sealed from the exterior by the annular seals 32.

The damping properties of the ball joint 50 are determined chiefly on the basis of the configuration of the tubes 80, 82, the guide rings 68, 70, the ball pivots 58, 60 with or without the annular collars 72, 74, and, lastly, the seals 32. Lubricant and damping medium may be specified and employed separately.

If a damping fluid possessing an electrorheologic property is used, it is necessary to use an electric insulating layer in the through opening (24) of the joint element (14, 54). Similarly, the cylindrical housing (12, 52) must be enclosed in an electrically insulating layer (110). The insulating layer may be, for example, in the form of an electrically insulating material (such as a plastic). This is necessary in order to prevent a short circuit when electric control voltage is applied to the electrorheologic fluid. The electric control voltage is provided by a control device (100).

The electric insulating layer may be dispensed with when a magnetorheologic fluid is used. A magnetic field which permits control of the damping characteristic of the ball joint is generated in the cavities through which damping fluid flows, by way of an external power supply (120) applied to an electric coil in the joint element (14, 54) or in the cylindrical housing (12,52).

The invention claimed is:

1. A ball joint for a wheel suspension system of a motor vehicle, said ball joint comprising:

a housing having an opening at each end defining a cavity therebetween and comprising an annular collar at one end thereof and an axially aligned threaded section at the other end thereof;

a pivot member extending through said housing having a ball section disposed within said cavity and a pair of axially opposed pivot shaft portions, each pivot shaft portion extending through one of said openings;

an annular threaded clamping ring threaded into said threaded section of said housing;

a first annular bearing disposed between said pivot member and said housing having a first portion engaging a first axial portion of said ball section and a first annular extension axially extending from said first portion of said first bearing and engaging said threaded clamping ring, said first annular extension surrounding one of said pivot shaft portions and forming an annular gap between said housing and said one pivot shaft portion;

a second annular bearing disposed between said pivot member and said housing having a first portion engaging a second axial portion of said ball section and a second annular extension axially extending from the first portion of said second bearing and engaging said annular collar, said second annular extension surrounding the other of said pivot shaft portions and forming an annular gap between said housing and said other pivot shaft portion;

a pair of annular seals, each seal disposed between and engaging a respective one of said pivot shaft portions and a respective one of said threaded clamping ring and said one housing end comprising said annular collar, each seal cooperating with a respective one of said first and second annular extensions to form a sealed annular chamber within a respective one of said annular gaps; and a damping fluid disposed in each of said chambers in direct contact with said ball section.

2. A ball joint according to claim 1, wherein the dimension of each of said annular chambers in an axial direction is at least three times greater than the dimension of such chamber in a radial direction, relative to an axis of said chamber.

3. A ball joint to claim 1, wherein opposed wall portions of each of said annular chambers are frusto-conically configured, diverging in a direction away from said ball section.

4. A ball joint according to claim 1, wherein said damping fluid possesses electrorheological properties.

5. A ball joint according to claim 4, including a controlled electric field imposed on said damping fluid.

6. A ball joint according to claim 1, wherein said damping fluid possesses magnetorheological properties.

7. A ball joint according to claim 6, including a controlled magnetic field imposed on said damping fluid.

8. A ball joint according to claim 1, wherein said sealing members are formed of a plastic material.

* * * * *